(12) United States Patent
Lakshmanan et al.

(10) Patent No.: US 6,517,963 B2
(45) Date of Patent: Feb. 11, 2003

(54) CARBON MONOXIDE FILTER (75) Inventors: Balasubramanian Lakshmanan, Columbia, SC (US); Chockkalingam Karuppaiah, Troy, NY (US)

(73) Assignee: Plug Power Inc., Latham, NY (US)

( * ) Notice: Subject to any disclaimer, the term of this patent is extended or adjusted under 35 U.S.C. 154(b) by 231 days.

(21) Appl. No.: 09/736,470

(22) Filed: Dec. 13, 2000

(65) Prior Publication Data
US 2002/0071977 A1 Jun. 13, 2002

(51) Int. Cl.[7] ................................. H01M 8/04
(52) U.S. Cl. ..................... 429/17; 429/13; 429/14; 429/19; 429/21; 429/23; 429/30; 429/32; 429/33; 429/34; 429/38; 429/39; 429/40; 429/41; 429/44
(58) Field of Search ............... 429/13, 14, 17, 429/30, 32–34, 38–41, 21, 19, 44, 23

(56) References Cited

U.S. PATENT DOCUMENTS

| | | |
|---|---|---|
| 4,910,099 A | 3/1990 | Gottesfeld |
| 5,271,916 A | 12/1993 | Vanderborgh et al. |
| 5,316,747 A | 5/1994 | Pow |
| 5,330,727 A | 7/1994 | Trocciola et al. |
| 5,432,021 A | 7/1995 | Wilkinson |
| 5,436,086 A | 7/1995 | Seymour et al. |
| 5,518,705 A | 5/1996 | Buswell et al. |
| 5,604,047 A * | 2/1997 | Bellows et al. ............ 429/19 |
| 5,637,415 A | 6/1997 | Meltser et al. |
| 5,712,052 A | 1/1998 | Kawatsu |
| 5,750,076 A | 5/1998 | Buswell |
| 5,843,195 A | 12/1998 | Aoyama |
| 5,871,860 A | 2/1999 | Frost et al. |
| 5,874,051 A * | 2/1999 | Heil et al. ............... 422/171 |
| 6,010,675 A | 1/2000 | Trocciola et al. |
| 6,309,769 B1 * | 10/2001 | Haug ..................... 429/13 |

* cited by examiner

Primary Examiner—Patrick Ryan
Assistant Examiner—Angela J Martin
(74) Attorney, Agent, or Firm—Fish & Richardson P.C.

(57) ABSTRACT

A fuel cell system includes a fuel cell having an electrode, and an electrochemical cell having a device. The electrochemical cell includes a cathode, an anode in fluid communication with the electrode of the fuel cell, and an electrolyte in electrical communication with the cathode and the anode. The device is in electrical communication with the anode of the electrochemical cell and adapted to vary the potential of the anode. The electrochemical cell and the device are capable of reducing an amount of carbon monoxide that enters the fuel cell system.

31 Claims, 7 Drawing Sheets

CARBON MONOXIDE FILTER

STATEMENT AS TO FEDERALLY SPONSORED RESEARCH

This invention was made with Government support under NIST Corporate Agreement No. 70NANB8H4039 awarded by the National Institute of Standards and Technology. The Government may have certain rights in the invention.

FIELD OF THE INVENTION

The invention relates to a carbon monoxide filter that can be used, for example, in a fuel cell system.

BACKGROUND

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a polymer electrolyte membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas comes into contact with and passes through the anode gas diffusion layer and interacts with the anode catalyst. Similarly, as the cathode gas flows through the channels of the cathode flow field plate, the cathode gas comes into contact with and passes through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons are formed at the anode side of the membrane electrode assembly, indicating that the anode gas undergoes oxidation during the fuel cell reaction. Electrons are consumed at the cathode side of the membrane electrode assembly, indicating that the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \tag{1}$$

$$\tfrac{1}{2}O_2 + 2H^+ + 2e^- \rightarrow H_2O \tag{2}$$

$$H_2 + \tfrac{1}{2}O_2 \rightarrow H_2O \tag{3}$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY

The invention relates to a carbon monoxide filter that can be used, for example, in a fuel cell system.

Under some circumstances, carbon monoxide is present in the anode gas and/or the cathode gas. Without a carbon monoxide filter, the carbon monoxide can adsorb to a catalyst layer of a fuel cell, thereby blocking sites for hydrogen adsorption and/or oxidation on the catalyst layer. This can reduce the performance of a fuel cell or a fuel cell stack.

The carbon monoxide filter includes an electrochemical cell that can be switched between an adsorbing potential and an oxidizing potential. The carbon monoxide filter can be disposed along the flow path of the gas such that the gas contacts the carbon monoxide filter layer before contacting the catalyst layer. When the cell is at the adsorbing potential, at least some of the carbon monoxide present in the gas can adsorb to the carbon monoxide filter, which reduces the amount of carbon monoxide that is available to adsorb to the catalyst layer, thereby improving performance of the fuel cell or fuel cell stack.

After adsorption, the filter can be regenerated or reactivated by switching the potential to the oxidizing potential, which oxidizes the adsorbed carbon monoxide to carbon dioxide. After oxidation, the cell is switched back to the adsorbing potential, which again reduces the amount of carbon monoxide in the gas by allowing the CO to adsorb on the filter. Thus, by cycling the potential of the filter between an adsorbing potential and an oxidizing potential, the amount of the CO in the gas is effectively minimized. The carbon monoxide filter can have a relatively compact, simple and economical design.

In one aspect, the invention features a fuel cell system that includes a fuel gas supply, a fuel cell having an electrode in fluid communication with the fuel gas supply, an electrochemical cell, and a device. The electrochemical cell includes a cathode, an anode in fluid communication with the fuel gas supply and the electrode of the fuel cell, and an electrolyte in electrical communication with the cathode and the anode. The device is in electrical communication with the anode and the cathode, and is adapted to vary the potential of the anode relative to the cathode.

In another aspect, the invention features a fuel cell system that includes a fuel cell having an electrode, an electrochemical cell, and a device. The electrochemical cell includes a cathode, an anode in fluid communication with the electrode of the fuel cell, and an electrolyte in electrical communication with the cathode and the anode. The device is in electrical communication with the anode of the electrochemical cell, and is adapted to vary the potential of the anode.

The electrochemical cell can be arranged as a membrane electrode assembly, for example, one having a first catalyst layer composing the cathode, a second catalyst layer composing the anode, and a solid electrolyte between the first and second layers. The electrolyte can include a solid polymer, such as one having sulfonic acid groups. The anode or second layer can include a material selected from a group consisting of ruthenium, molybdenum, and iridium. The cathode is capable of serving as a reference hydrogen electrode.

The electrochemical cell can further include a first gas diffusion layer and a second gas diffusion layer, wherein the first catalyst layer is between the first gas diffusion layer and the solid electrolyte, and the second catalyst layer is between the second gas diffusion layer and the solid electrolyte.

The electrochemical cell can be between the fuel cell and the fuel gas supply, such as a reformer capable of producing a gas comprising hydrogen. The fuel cell can be between the fuel gas supply and the electrochemical cell. The fuel supply system can be in fluid communication with the anode.

The device is adapted to control the potential of the anode relative to the potential of the cathode.

In some embodiments, the fuel cell system further includes a second electrochemical cell having a cathode, an anode in fluid communication with the electrode of the fuel cell, and an electrolyte in electrical communication with the cathode and the anode. The cathode of the first electrochemical cell can be in fluid communication with the cathode of the second electrochemical cell.

The fuel cell system can further include a mixing chamber in fluid communication with the anode and the electrode of the fuel cell.

In another aspect, the invention features a method of treating a gas flow in a fuel cell system. The method includes contacting an anode of an electrochemical cell with an inlet gas stream, and changing the potential of the anode.

Changing the potential of the anode can include cycling the potential between a first potential and a second potential, e.g., as a function of time or a detected current.

The first potential can be at a level sufficient for carbon monoxide to adsorb to the anode, such as about zero relative to a reference hydrogen electrode, and the second potential can be at a level sufficient for the anode to oxidize the adsorbed carbon monoxide. The potential of the anode can be changed relative to a potential of a cathode of the electrochemical cell.

The method can further include contacting the inlet gas stream with an anode of a second electrochemical cell and/or mixing the inlet gas stream.

Other features, objects, and advantages of the invention will be apparent from the drawings, description, and claims.

DETAILED DESCRIPTION

Figure 1:
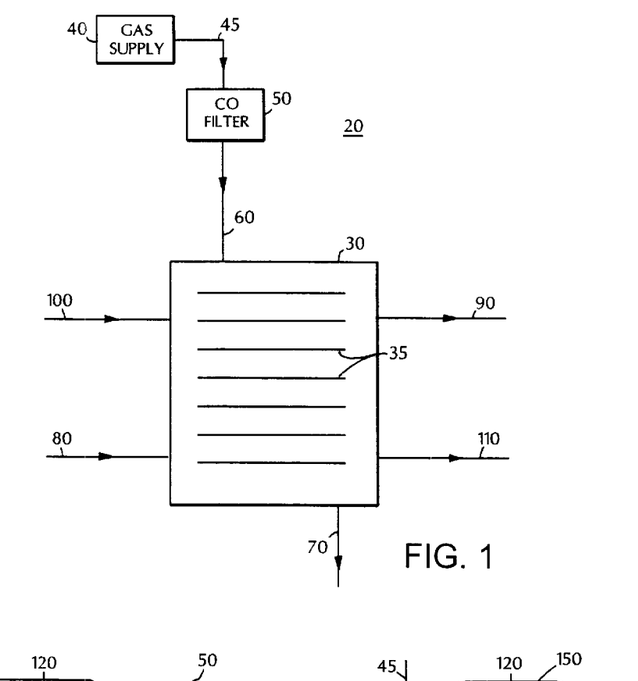
FIG. 1 is a partial, schematic diagram of an embodiment of a fuel cell system.

Referring to FIG. 1, a fuel cell system 20 includes a full cell stack 30 having a plurality of fuel cells 35. Fuel cell system 20 also includes an anode gas supply 40, a filter inlet line 45, a carbon monoxide (CO) filter 50, an anode gas inlet line 60, an anode gas outlet line 70, a cathode gas inlet line 80, a cathode gas outlet line 90, a coolant inlet line 100, and a coolant outlet line 110.

Figure 2:
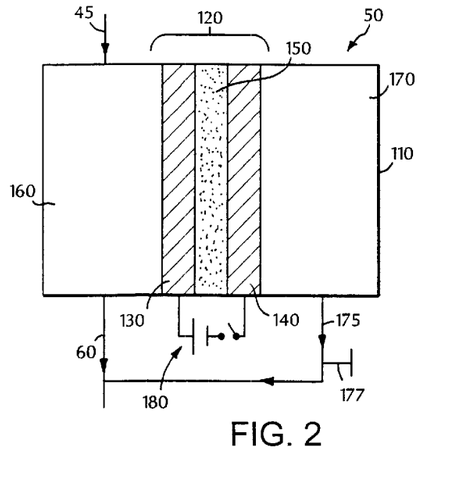
FIG. 2 is a schematic diagram of an embodiment of a carbon monoxide filter.

FIG. 2 shows an embodiment of CO filter 50 having a housing 110 that is divided into two compartments by a membrane electrode assembly (MEA) 120. MEA 120 includes an anode 130, a cathode 140, and a solid electrolyte 150 between the anode and the cathode. Anode 130 and housing 110 together define a first compartment 160 through which the anode gas flows from inlet line 45 to inlet line 60; and cathode 140 and housing 110 together define a second compartment 170 having a reference material, such as hydrogen gas, such that the cathode may serve as a reference electrode. Compartment 170 is in fluid communication with inlet line 60 via line 175 having a pressure relief valve 177 so that excess hydrogen gas formed by cathode 140 (described below) may flow to fuel cell stack 30. The reference material in compartment 170 may be stagnant or flowing, e.g., flowing hydrogen gas in a closed chamber. CO filter 50 further includes a voltage source 180 that is in electrical communication with anode 130 and cathode 140. Voltage source 180 is any apparatus that can control the potential of anode 130 relative to cathode 140, such as a variable voltage generator.

MEA 120 and voltage source 180 are capable of reducing the concentration of CO in the anode gas by contacting anode 130 with the gas and cycling the potential of the anode. Anode 130 is formed of a material to which carbon monoxide can adsorb and from which carbon monoxide may be oxidized, according to the potential of anode 130 as controlled by voltage source 180. When anode 130 is at a predetermined adsorbing potential, such as about 0–50 mV versus a reference hydrogen electrode (RHE), i.e., cathode 140, CO adsorbs on the anode. When anode 130 is at a predetermined oxidizing potential, such as about 0.9 V vs. RHE, CO is oxidized from the anode. Solid electrolyte 150 is a material capable of allowing ions, such as protons, to flow therethrough while providing a substantial resistance to the flow of electrons and gases. Cathode 140 is formed of a material capable of enabling protons and electrons to react and to form hydrogen gas.

In operation, anode gas flows from anode gas supply 40, e.g., a reformer, to CO filter 50 via inlet line 45. Voltage source 180 sets anode 130 at an adsorbing potential. As the anode gas, which commonly includes hydrogen, water vapor, carbon monoxide, and other reformate gases, contacts anode 130, CO adsorbs on the anode, effectively reducing the amount of CO in the anode gas stream that flows to inlet 60 and into fuel cell stack 30. At a predetermined time, voltage source 180 changes the potential of anode 130 relative to cathode 140 from the adsorbing potential to an oxidizing potential. At the oxidizing potential, anode 130 electrolyzes water from the anode gas and produces protons, electrons and oxygen. The protons migrate through solid electrolyte 150 and to cathode 140. The electrons flow through voltage source 180 and to cathode 140. The formed oxygen reacts with carbon monoxide adsorbed to anode 130 to form relatively inert gaseous carbon dioxide, which is removed from compartment 160 by the anode gas stream. Meanwhile, cathode 140 interacts with the protons formed at anode 130 and electrons from voltage source 180 to form hydrogen gas, which is released into compartment 170. The formed hydrogen gas can flow to fuel cell stack 30 via line 175 and inlet line 60.

After a predetermined time at the second potential, voltage source 180 switches the potential of anode 130 relative to cathode 140 from the oxidizing potential back to the adsorbing potential and repeats the process described above. As described above, carbon monoxide in the anode gas adsorbs to anode 130, and after a predetermined amount of time, voltage source 180 switches the potential of anode 130 to the oxidizing potential to oxidize the CO. By switching or cycling the potential of anode 130 between the first adsorbing potential and the second oxidizing potential, filter 50 reduces some of the carbon monoxide in the anode gas that flows from anode gas supply 40 to fuel cell stack 30. Thus, fuel cell stack 30 can provide improved performance relative to an otherwise substantially identical fuel cell stack operating under the same operating conditions that does not include CO filter 50.

Figure 3:
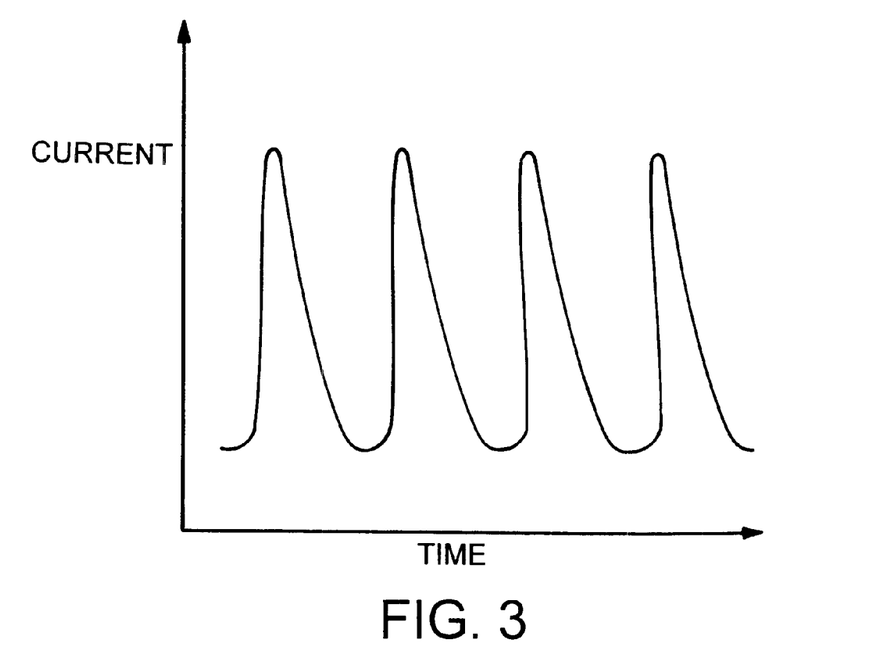
FIG. 3 is an illustration of current as a function of time.

The timing at which the potential of anode 130 is switched can be controlled by monitoring the current flow from MEA 120. Referring to FIG. 3, when the potential of anode 130 is switched from the adsorbing potential to the oxidizing potential, current flow through voltage source 180 typically increases or spikes because water is being electrolyzed and CO is being oxidized, thereby producing a flow of electrons. As CO is oxidized and eliminated, the current decreases and reaches a steady state current, indicating that most, if not all, of the adsorbed CO has been oxidized. Thus, by monitoring the current flow, voltage source 180 can be programmed to switch the potential of anode 130 from the oxidizing potential to the adsorbing potential when the current has reached a steady state. Alternatively, by using parameters such as the kinetics of CO oxidation and the surface area of the anode, it is possible to calculate the time it takes to oxidize a calculated amount of CO adsorbed on anode 130. Voltage source 180 can be programmed to switch to the adsorbing potential according to the calculated time needed for oxidation.

Similarly, by using parameters such as the anode gas flow rate, the kinetics of CO adsorption on anode 130, the effective surface area of anode 130, the levels of CO in the anode gas, and the desired CO concentration in the anode gas that flows to fuel cell stack 30, it is possible to calculate the time it takes for CO to adsorb to anode 130. Voltage source 180 can be programmed to switch from an adsorbing potential to an oxidizing potential according to the calculated time of adsorption.

Referring again to FIG. 2, anode 130 can be formed of any material capable of oxidizing CO and adsorbing CO, while not adsorbing or minimally adsorbing hydrogen relative to CO adsorption. The material is also capable of withstanding changes in potential, as described above, without deleterious effects such as irreversible oxide formation. Such materials include, for example, platinum, ruthenium, molybdenum, iridium, and their alloys. The material can be dispersed on a support, for example, carbon black. During the preparation of MEA 120, the anode material can be applied to electrolyte 150 using standard fuel cell techniques. In some embodiments, anode 130 can be formed by applying a suspension containing the material of anode 130 to the surface of a gas diffusion layer (described below) that faces solid electrolyte 150, and then drying the suspension. The method of preparing anode 130 can involve the use of heat and/or pressure to achieve bonding.

Solid electrolyte 150 should be capable of allowing ions to flow therethrough while providing a substantial resistance to the flow of electrons. In some embodiments, electrolyte 150 is a solid polymer (e.g., a solid polymer electrolyte membrane), such as a solid polymer proton exchange membrane (e.g., a solid polymer containing sulfonic acid groups). Such membranes are commercially available from E.I. DuPont de Nemours Company (Wilmington, Del.) under the trademark NAFION. Alternatively, electrolyte 150 can also be prepared from the commercial product GORE-SELECT, available from W.L. Gore & Associates (Elkton, Md.).

Cathode 140 can be formed of any material capable of interacting with protons and electrons to form hydrogen. Examples of such materials include, for example, platinum, platinum alloys, and platinum dispersed on carbon black. Cathode 140 can be prepared as described above with respect to anode 130.

Figure 4:
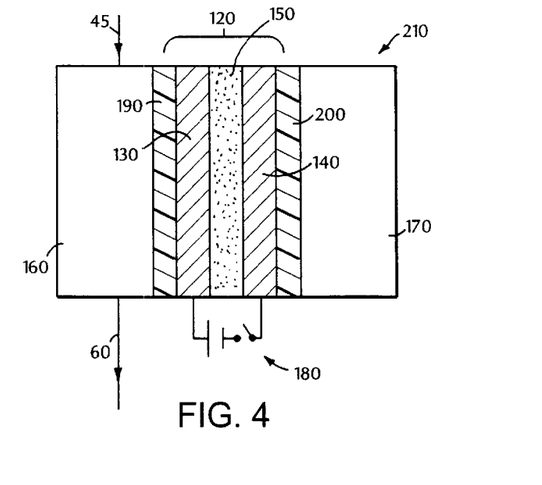
FIG. 4 is a schematic diagram of an embodiment of a carbon monoxide filter.

FIG. 4 shows another embodiment of CO filter 210 having MEA 120 between two electrically conductive gas diffusion layers (GDLs) 190 and 200. GDLs can be formed of a material that is both gas and liquid permeable. It may also be desirable to provide the GDLs with a planarizing layer, as is known in the art, for example, by infusing a porous carbon cloth or paper with a slurry of carbon black followed by sintering with a polytetrafluoroethylene material. Suitable GDLs are available from various companies such as Etek in Natick, Mass., and Zoltek in St. Louis, Mo. In some embodiments of CO filter 210, compartment 170 is in fluid communication with inlet line 60, as described above.

Figure 5:
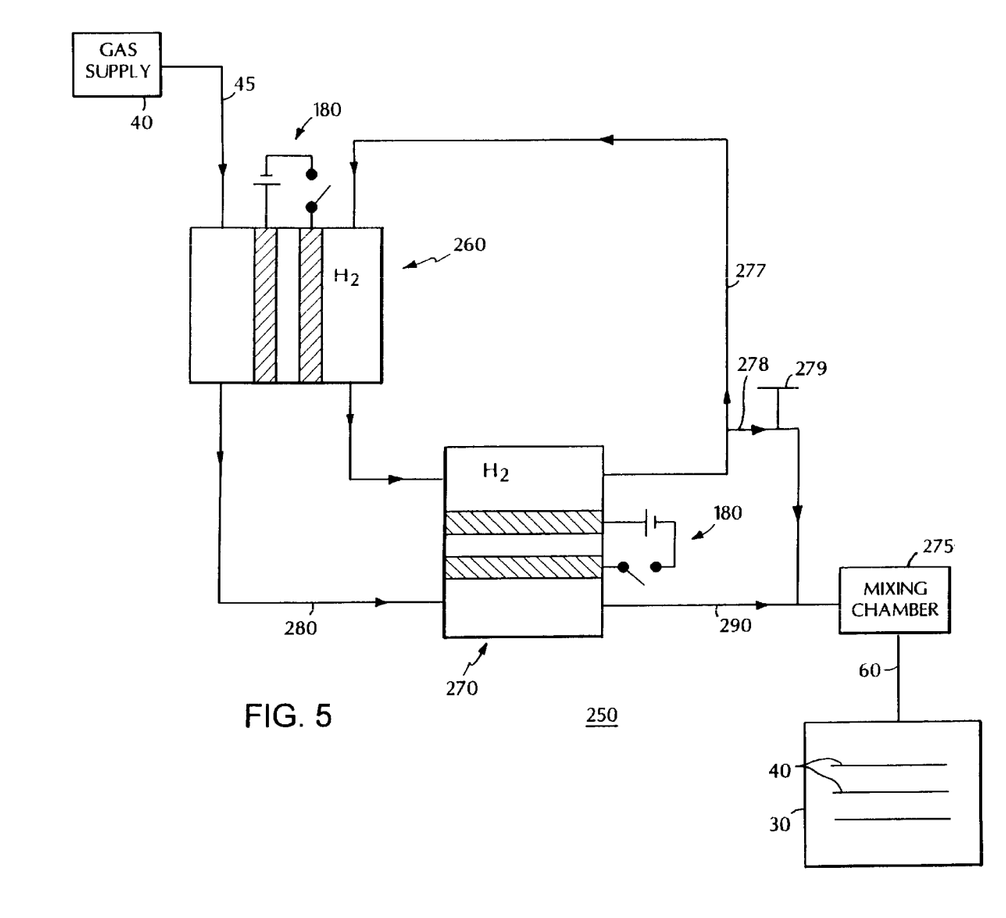
FIG. 5 is a partial, schematic diagram of an embodiment of a fuel cell system.

FIG. 5 shows another embodiment of fuel cell system 250 further having multiple (in this case, two) CO filters 260 and 270 arranged in series, and a mixing chamber 275. Operating multiple CO filters reduces the amount of CO in the anode gas more than operating one CO filter. Filters 260 and 270 are substantially the same in construction and operation as filter 50 described above. The cathode sides of filters 260 and 270 are part of a hydrogen system that includes line 277 and pressure relief valve 279. Line 277 is in fluid communication with line 290 via line 278, so that excess hydrogen formed by the cathodes can flow to mixing chamber 275 and stack 30, similar lines 60 and 175 (FIG. 2). Mixing chamber 275 is generally a volume in which the filtered anode gas is subjected to turbulence, e.g., by a moving paddle, such that the anode gas flowing into fuel cell stack 30 is homogeneous.

Similar to the operation of fuel cell system 20 (shown in FIG. 1), anode gas supply 40 provides anode gas via inlet line 45 to the anode side of CO filter 260, which reduces the amount of CO in the anode gas by adsorption and oxidation as described above. The filtered anode gas then flows via inlet line 280 to the anode side of CO filter 270, which further reduces the amount of CO in the anode gas. The twice-filtered anode gas then flows via line 290 to mixing chamber 275. The mixed anode gas then flows to fuel cell stack 30 to be used by fuel cells 40.

Figure 6:
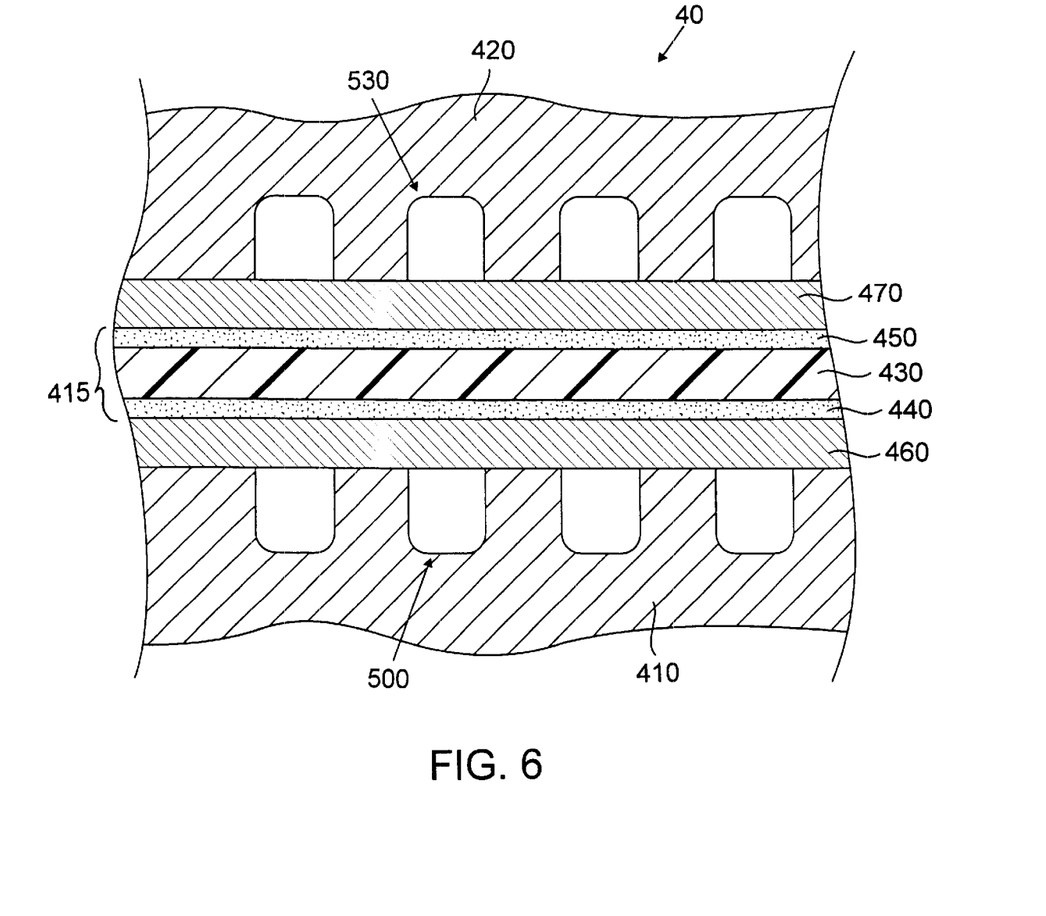
FIG. 6 is a partial cross-sectional view of an embodiment of a cathode flow field plate.

An exemplary embodiment of fuel cell 35 will now be described. FIG. 6 shows a partial cross-section of fuel cell 40 that includes a cathode flow field plate 410, anode flow field plate 420, a membrane electrode assembly (MEA) 415 having a solid electrolyte 430, cathode catalyst layer 440, and anode catalyst layer 450, and gas diffusion layers (GDLs) 460 and 470. Fuel cells 40 can be arranged by having the back surface of a cathode flow field plate of one fuel cell serve as the anode flow field plate in the next fuel cell. A plurality of coolant flow field plates (described below) can also be used in this arrangement.

Electrolyte 430 is generally as described above with respect to electrolyte 150.

Cathode catalyst layer 440 can be formed of a material capable of interacting with oxygen, electrons and protons to form water. Examples of such materials include, for example, platinum, platinum alloys, and noble metals dispersed on carbon black. Catalyst layer 440 can be prepared as described above with respect to anode 130.

Anode catalyst layer 450 can be formed of a material capable of interacting with hydrogen to form protons and electrons. Examples of such materials include, for example, platinum, platinum alloys, and platinum dispersed on carbon black. Catalyst layer 450 can be prepared as described above with respect to anode 130.

Gas diffusion layers 460 and 470 are typically formed of a material as described above with respect to GDLs 190 and 200. In addition, gas diffusion layers 460 and 470 should be electrically conductive so that electrons can flow from catalyst layer 450 to flow field plate 420 and from flow field plate 410 to catalyst layer 440.

Figure 7:
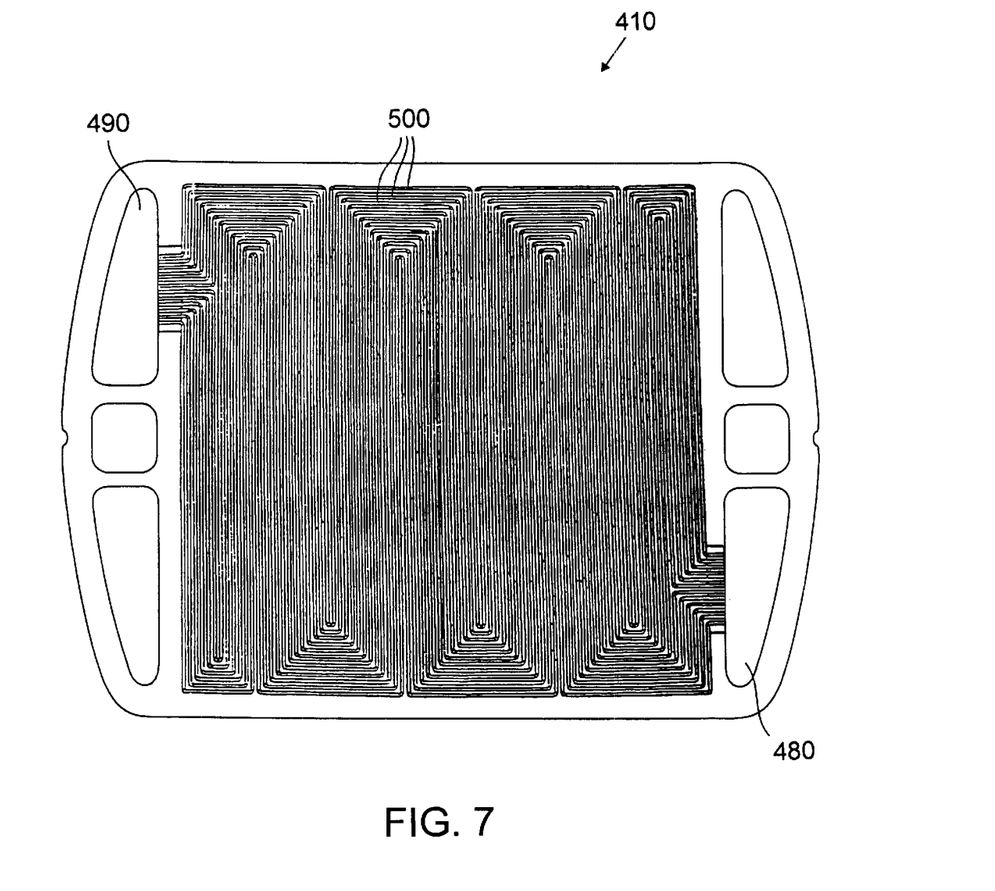
FIG. 7 is a elevational view of an embodiment of a cathode flow field plate.

FIG. 7 shows a cathode flow field plate 410 having an inlet 480, an outlet 490, and open-faced channels 500 that define a flow path for a cathode gas from inlet 410 to outlet 490. A cathode gas flows from cathode gas inlet line 80 and enters flow field plate 410 via inlet 480 to cathode outlet line 90. The cathode gas then flows along channels 500 and exits flow field plate 410 via outlet 490. As the cathode gas flows along channels 500, oxygen contained in the cathode gas can permeate gas diffusion layer 460 and interact with catalyst layer 440. Electrons and protons present at layer 440 react with the oxygen to form water. The water can pass back through diffusion layer 460, enter the cathode gas stream in channels 500, and exit plate 410 through cathode flow field plate outlet 490.

Figure 8:
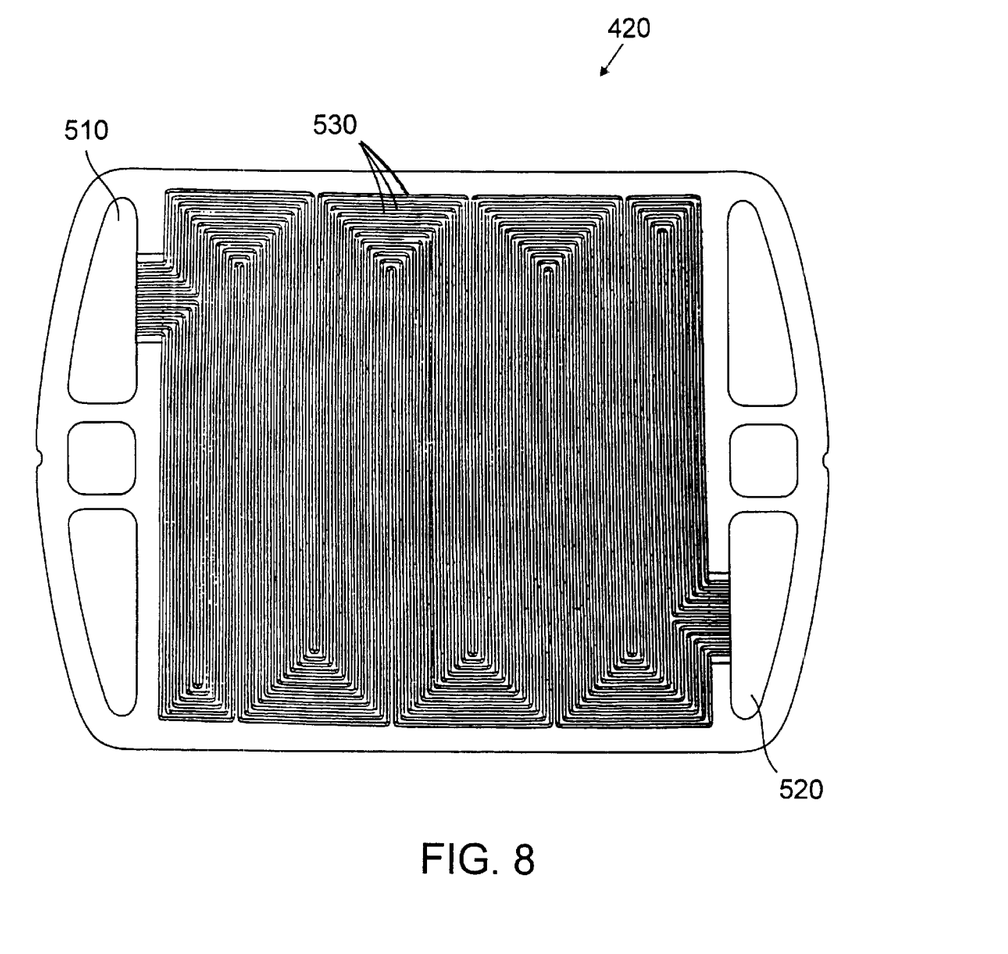
FIG. 8 is a elevational view of an embodiment of an anode flow field plate.

FIG. 8 hows an anode flow field plate 420 having an inlet 510, an outlet 520, and open-faced channels 530 that define a flow path for an anode gas from inlet 510 to outlet 520. An anode gas flows from the anode gas inlet line 60 and enters flow field plate 420 via inlet 510. The anode gas then flows along channels 530 and exits flow field plate 420 via outlet 520 to anode outlet line 70. As the anode gas flows along channels 530, hydrogen contained in the anode gas can permeate gas diffusion layer 470 and interact with catalyst layer 450 to form protons and electrons. The protons pass through solid electrolyte 430, and the electrons are conducted through gas diffusion layer 470 to anode flow field plate 420, ultimately flowing through an external load to cathode flow field plate 410.

Figure 9:
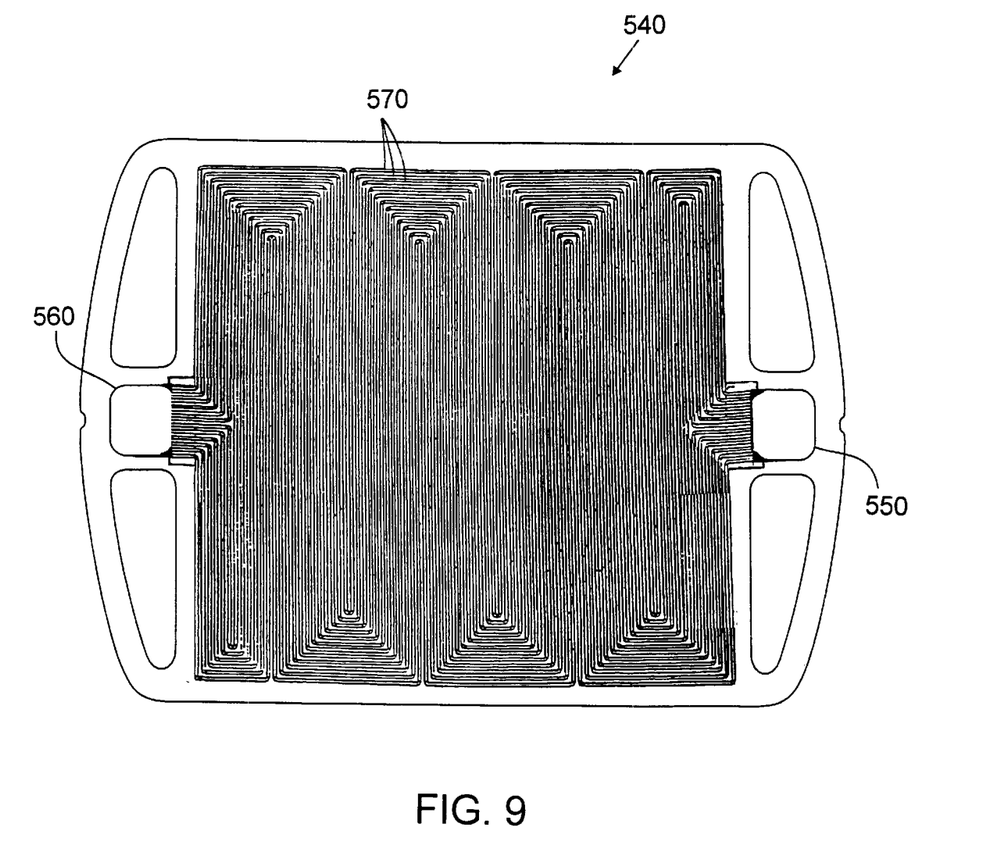
FIG. 9 is a elevational view of an embodiment of a coolant flow field plate.

Heat produced during the fuel cell reaction is removed from fuel cell 40 by flowing a coolant through fuel cell 40 via a coolant flow field plate. FIG. 9 shows a coolant flow field plate 540 having an inlet 550, an outlet 560 and open-faced channels 570 that define a flow path for coolant from inlet 550 to outlet 560. The coolant enters fuel cell 40 from coolant inlet line 100 via inlet 550, flows along channels 570 and absorbs heat, and exits fuel cell 40 via outlet 560 to coolant outlet line 110.

Fuel cells 40 are arranged within fuel cell stack 30 such that inlets 510 are configured to be in fluid communication with anode gas inlet line 60, and outlets 520 are configured to be in fluid communication with anode gas outlet line 70. Similarly, inlets 480 are configured to be in fluid communication with cathode gas inlet line 80, and outlets 490 are configured to be in fluid communication with cathode gas outlet line 90. Likewise, inlets 550 are configured to be in fluid communication with coolant inlet line 100, and outlets 560 are configured to be in fluid communication with coolant gas outlet line 110.

Methods of making membrane electrode assemblies are known, and are described, for example, in U.S. Pat. No. 5,211,984, which is hereby incorporated by reference.

In other embodiments, MEA 120 in filter 50 or 210 can be formed in other configurations that maximize surface area contact between the anode gas and the anode of the MEA. The CO filter may use a reference electrode different than the cathode of the MEA. The reference electrode may be external to the filter. The reference electrode may be other than an RHE.

Generally, the adsorbing potential(s) can be any potential that maximizes CO adsorption on the anode; and the oxidizing potential(s) can be any potential sufficient to oxidize CO. The CO filter may cycle its MEA between more than two potentials. For example, the fuel cell system may include a CO sensor between the anode gas supply and the CO filter. The adsorption/oxidation potentials and cycling profile of CO filter can be adjusted as a function of operating parameters, such as CO concentration, anode gas flow rate, CO tolerance of the fuel cells, and power output, in order to maximize the efficiency of the fuel cell system.

Mixing chamber 275 can also be used in fuel cell systems having only one CO filter.

The fuel cell systems described above may further include one or more CO filters downstream of fuel cell stack, wherein anode gas outlet line 70 is in fluid communication with the anode of the filter. By operating the filter(s) as described above, the CO emission from the fuel cell system can be reduced or eliminated. The CO filter can also be used on the cathode side of the fuel cell system.

Other embodiments are in the claims.

What is claimed is:

1. A fuel cell system, comprising:
   a fuel gas supply;
   a fuel cell comprising an electrode in fluid communication with the fuel gas supply;
   an electrochemical cell comprising:
      a cathode;
      an anode in fluid communication with the fuel gas supply and the electrode of the fuel cell; and
      an electrolyte in electrical communication with the cathode and the anode; and
   a device in electrical communication with the anode and the cathode, the device adapted to vary the potential of the anode relative to the cathode.

2. The fuel cell system of claim 1, wherein the electrolyte comprises a solid polymer electrolyte membrane.

3. The fuel cell system of claim 1, wherein the electrochemical cell is between the fuel gas supply and the fuel cell.

4. The fuel cell system of claim 1, wherein the fuel cell is between the fuel gas supply and the electrochemical cell.

5. The fuel cell system of claim 1, wherein the fuel gas supply is a reformer capable of producing a gas comprising hydrogen.

6. The fuel cell system of claim 1, wherein the electrochemical cell is arranged as a membrane electrode assembly.

7. A fuel cell system, comprising:
   a fuel cell comprising:
      an electrode;
   an electrochemical cell comprising:
      a cathode;
      an anode in fluid communication with the electrode of the fuel cell;
      an electrolyte in electrical communication with the cathode and the anode; and
   a device in electrical communication with the anode of the electrochemical cell, the device adapted to vary the potential of the anode.

8. The fuel cell system of claim 7, wherein the electrolyte comprises a solid polymer.

9. The fuel cell system of claim 8, wherein the solid polymer comprises sulfonic acid groups.

10. The fuel cell system of claim 7, wherein the anode comprises a material selected from a group consisting of ruthenium, molybdenum, and iridium.

11. The fuel cell system of claim 7, wherein the electrochemical cell comprises:
   a first catalyst layer composing the cathode;
   a second catalyst layer composing the anode; and
   a solid electrolyte between the first and second layers.

12. The fuel cell system of claim 11, further comprising:
   a first gas diffusion layer; and
   a second gas diffusion layer,
   wherein the first catalyst layer is between the first gas diffusion layer and the solid electrolyte, and the second catalyst layer is between the second gas diffusion layer and the solid electrolyte.

13. The fuel cell system of claim 11, wherein the solid electrolyte comprises a solid polymer electrolyte membrane.

14. The fuel cell system of claim 11, wherein the second catalyst layer comprises a material selected from a group consisting of ruthenium, molybdenum, and iridium.

15. The fuel cell system of claim 7, wherein the device is adapted to control the potential of the anode relative to the potential of the cathode.

16. The fuel cell system of claim 15, wherein the cathode is capable of serving as a reference hydrogen electrode.

17. The fuel cell system of claim 7, further comprising:
   a second electrochemical cell comprising:
      a cathode;
      an anode in fluid communication with the electrode of the fuel cell; and
      an electrolyte in electrical communication with the cathode and the anode.

18. The fuel cell system of claim 17, wherein the cathode of the first electrochemical cell is in fluid communication with the cathode of the second electrochemical cell.

19. The fuel cell system of claim 7, further comprising a mixing chamber in fluid communication with the anode and the electrode of the fuel cell.

20. The fuel cell system of claim 7, further comprising:
   a fuel supply system in fluid communication with the anode.

21. The fuel cell system of claim 20, wherein the fuel supply system comprises a reformer.

22. A method of treating a gas flow in a fuel cell system, the method comprising:
   contacting an anode of an electrochemical cell with an inlet gas stream; and changing the potential of the anode.

23. The method of claim 22, wherein changing the potential of the anode comprises cycling the potential between a first potential and a second potential.

24. The method of claim 23, wherein cycling the potential is performed as a function of time.

25. The method of claim 23, wherein cycling the potential is performed as a function of a detected current.

26. The method of claim 23, wherein
the first potential is at a level sufficient for carbon monoxide to adsorb to the anode; and
the second potential is at a level sufficient for the anode to oxidize the adsorbed carbon monoxide.

27. The method of claim 22, wherein the potential of the anode is sufficient for the anode to oxidize carbon monoxide.

28. The method of claim 22, wherein the potential of the anode is about zero relative to a reference hydrogen electrode.

29. The method of claim 22, wherein the potential of the anode is changed relative to a potential of a cathode of the electrochemical cell.

30. The method of claim 22, further comprising contacting the inlet gas stream with an anode of a second electrochemical cell.

31. The method of claim 22, further comprising mixing the inlet gas stream.

* * * * *